(12) United States Patent
Phatak

(10) Patent No.: US 7,853,680 B2
(45) Date of Patent: Dec. 14, 2010

(54) SPREAD IDENTITY COMMUNICATIONS ARCHITECTURE

(76) Inventor: Dhananjay S. Phatak, 2720 Millers Way Dr., Ellicott City, MD (US) 21043

( * ) Notice: Subject to any disclaimer, the term of this patent is extended or adjusted under 35 U.S.C. 154(b) by 284 days.

(21) Appl. No.: 11/841,037

(22) Filed: Aug. 20, 2007

(65) Prior Publication Data

US 2009/0031042 A1 Jan. 29, 2009

Related U.S. Application Data

(60) Provisional application No. 60/947,413, filed on Jun. 30, 2007, provisional application No. 60/896,819, filed on Mar. 23, 2007.

(51) Int. Cl.
*G06F 15/13* (2006.01)
(52) U.S. Cl. .................. 709/223; 709/227; 709/228; 709/230; 370/401
(58) Field of Classification Search ............... 709/227, 709/228, 230; 370/401
See application file for complete search history.

(56) References Cited

U.S. PATENT DOCUMENTS

| 6,754,709 B1 * | 6/2004 | Gbadegesin ............... 709/227 |
| 7,224,696 B2 * | 5/2007 | Bouleros et al. ............ 370/401 |
| 2003/0172170 A1* | 9/2003 | Johnson et al. ............. 709/230 |
| 2007/0002761 A1 | 1/2007 | Diamant et al. |
| 2008/0133760 A1* | 6/2008 | Berkvens et al. ............ 709/228 |

OTHER PUBLICATIONS

Adiseshu, H., et al., "A Reliable and Scalable Striping Protocol," In *Proceedings of the ACM SIGCOMM*, 1996, pp. 131-141.

Adjie-Winoto, W., et al., "The design and implementation of an intentional naming system," in *Proceedings of 17th ACM SOSP*, Kiawah Island, SC, 1999, pp. 186-201.

Akamai, Inc., Fast Internet Content Delivery with FreeFlow, Apr. 2000 http://www.cs.washington.edu/homes/ratul/akamai/freeflow.pdf (12 pages).

Allman, M., et al., "An Application-Level Solution to TCP's Satellite Inefficiencies," In *Proceedings of the First International Workshop on Satellite-based Information Services (WOSBIS)*, Rye, NY, Nov. 1996, pp. 1-8.

(Continued)

*Primary Examiner*—Jinsong Hu
(74) *Attorney, Agent, or Firm*—Blank Rome LLP

(57) ABSTRACT

Real routable external addresses may be pooled rather than assigned to nodes and may be dynamically bound to connections by a proxy or gateway device in ways that spread apparent identity of individual nodes across multiple of the external addresses. In general, these spread identity techniques may be employed at one end or the other of a connection, as well as at both ends. In a typical double-ended configuration, the architecture and associated techniques provide "double-blindfolding," wherein true identities (addresses) of communicating peers are always hidden from each other. In some double-ended configurations, dynamic binding may be employed at a fine level of granularity, for instance allowing individual packets associated with given connection to bear different apparent source addresses and/or different apparent destination addresses. In some single-ended configurations, a spread identity proxy is interposed between an information server and a plurality of requesters. The proxy redirects individual inbound connection requests for information from the information server to distinct addresses of a pool and establishes corresponding network address translations thereby dynamically spreading identity of the information server across multiple distinct addresses of the pool.

15 Claims, 8 Drawing Sheets

OTHER PUBLICATIONS

Anderson, T., et al., "Overcoming the Internet Impasse through Virtualization," *IEEE Computer Society*, Apr. 2005, pp. 34-41.

Balakrishnan, H., et al., "A Layered Naming Architecture for the Internet," In *Proceedings of SIGCOMM'04*, Portland, OR, Sep. 2004, pp. 343-352.

Belenky, A. and Ansari, N., "On IP traceback," *IEEE Communications Magazine*, Jul. 2003, pp. 142-153.

Cheriton, D.R. and Gritter, M., "Triad: A New Next-Generation Internet Architecture," Mar. 2000, http://www-dsg.stanford.edu/triad/triad.ps.gz, pp. 1-20.

Cheriton, D.R. and Gritter, M., "Triad: A Scalable Deployable NAT-based Internet Architecture," Stanford Computer Science Technical Report, Jan. 2000, pp. 1-18.

Crawford, M., and Huitema, C., "DNS Extensions to Support IPv6 Address Aggregation and Renumbering," Jul. 2000, RFC 2874, 20 pages.

Estrin, D., et al., "Protocol Independent Multicast-Sparse Mode (PIM-SM): Protocol Specification," Network Working Group, CISCO, Jun. 1997, 66 pages.

Goff, T. and Phatak, D.S., "Unified Transport Layer Support for Data Striping and Host Mobility," *IEEE Journal of Selected Areas in Communications* vol. 22, May 2004, pp. 737-746.

Goff, T., et al., "Preemptive Routing in Ad Hoc Networks," in *Proceedings of the ACM MOBICOM*, Jul. 2001, pp. 43-52.

Goff, T., et al., "Freeze-TCP: A true end-to-end TCP enhancement mechanism for mobile environments," In *Proceedings of the IEEE INFOCOM'2000*, Tel-Aviv, Israel, Mar. 2000, vol. 3, pp. 1537-1545.

Gritter, M., and Cheriton, D., "An Architecture for Content Routing Support in the Internet," in *Proceedings of the 3rd USENIX Symposium on Internet Technologies and Systems (USITS '01)*, Mar. 26-28, 2001, San Francisco, http://www.usenix.org/publications/library/proceedings/usits01/gritter.html, 12 pages.

Hacker, T., et al., "The End-to-End Performance Effects of Parallel TCp Sockets on a Lossy Wide-Area Network," In *Proceedings of the 16th IEEE-CS/ACM International Parallel and Distributed Processing Symposium (IPDPS)*, Apr. 2002, pp. 1-10.

Handley, M. and Greenhalgh, A., "Steps Towards a DoS-resistant Internet Architecture," SIGCOMM'04 Workshops, Portland, OR, Sep. 2004, pp. 49-56.

Hommel, W., "An Architecture for Privacy-Aware Inter-domain Identity Management," in *Proceedings of DSOM 2005*, pp. 49-60.

Hsieh, H.-Y, and Sivakumar, R., "A Transport Layer Approach for Achieving Aggregate Bandwidths on Multi-homed Mobile Hosts," MOBICOM'02, Atlanta, GA (Sep. 23-28, 2002), pp. 83-94.

Huitema, C., Multi-homed TCP. Internet Draft, Internet Engineering Task Force, May 1995. Expired, http://www3.tools.ietf.org/html/draft-huitema-multi-homed-01, pp. 1-19.

Huitema, C., and Draves, R., "Host-Centric IPv6 Multihoming," Internet Draft, Internet Engineering Task Force, Oct. 2001, Work-in-progress, http://tools.ietf.org/html/draft-huitema-multi6-hosts-03, pp. 1-51.

Lakshminarayanan, K., et al., "Brief Announcement: Towards a Secure Indirection Infrastructure," PODC'04, St. John's, Newfoundland, Canada (Jul. 25-28, 2004), p. 383.

Magalhaes, L. and Kravets, R., Transport Level Mechanisms for Bandwidth Aggregation on Mobile Hosts, In *Proceedings of the 9th International Conference on Network Protocols (ICNP)* 2001, pp. 165-171.

Mahajan, R., "How akamai works," http://www.cs.washington.edu/homes/ratul/akamai.html downloaded on Aug. 14, 2007, pp. 1-5.

Mirkovik, J., et al., "A Taxonomy of DDoS Attacks and DDoS Defense Mechanisms," Tech. rep., UCLA CS Department, 2002, pp. 1-12.

Phatak, D., "Spread-Identity mechanisms for DOS resilience and Security," IEEE Computer Society, *Proceedings of the First International Conference on Security and Privacy for Emerging Areas in Communications Networks*, 2005, pp. 1-12.

Phatak, D., and Goff, T., "A Novel Mechanism for Data Streaming Across Multiple IP Links for Improving Throughput and Reliability in Mobile Environments," in *Proceedings of the IEEE INFOCOM*, Jun. 2002, pp. 773-781.

Rivest, R., "Chaffing and Winnowing: Confidentiality without Encryption," Mar. 1998, theory.lcs.mit.edu/rivest/chaffing.txt, pp. 1-9.

Sivakumar, H. et al., "PSockets: The Case for Application-level Network Striping for Data Intensive Applications using High Speed Wide Area Networks," IEEE Computer Society, *Proceedings of the IEEE/ACM SC* 2000, 6 pages.

Snoeren, A. and Balakrishnan, H., "An End-to-End Approach to Host Mobility," in *Proceedings of the ACM MOBICOM*, Boston, Aug. 2000, pp. 155-166.

Snoeren, A., "Adaptive Inverse Multiplexing for Wide-Area Wireless Networks," In *IEEE Globecom* 1999, pp. 1665-1672.

Stewart, R. R. et al., "SCTP Extensions for Dynamic Reconfiguration of IP Addresses and Enforcement of Flow and Message Limits," http://www.ietf.org/internet-drafts/draft-ieff-tsvwg-addip-sctp-02.txt, Jun. 2001, pp. 1-27.

Stocia, I. et al., "Internet Indirection Infrastructure," in *Proceedings of the ACM SIGCOMM 2002*, vol. 32, 4, (new York), ACM Press, Aug. 19-23, 2002, pp. 73-88.

Stone, R., "CenterTrack: An IP Overlay Network for Tracking DoS Floods," in *Proceedings of the 9th USENIX Security Symposium*, Denver, CO, Aug. 14-17, 2000, 15 pages.

Strayer, T. et al., "An Integrated Architecture for Attack Attribution," tech. rep., BBN Technologies, 10 Moulton Street, Cambridge, MA 02138, 2003, pp. 1-37.

Subramanian, L. et al., "OverQoS: An Overlay based Architecture for Enhancing Internet QoS," In NSDI, University of California at Berkeley, 2004, pp. 71-84.

Tarr, C., "Identity Indirection," 1995, downloaded from www.cs.wustl.edu/~schmidt/OOPSLA-95/html/papers/pat.ps.gz on Sep. 13, 2007, pp. 1-12.

Wallfish, M. et al., "DDoS Defense by Offense," In *Proceedings of the ACM SIGCOMM'06*, Sep. 11-15, 2006, Pisa, Italy, pp. 303-314.

Zhuang, S. et al., "Host Mobility Using an Internet Indirection Infrastructure," In *Proceedings of MobiSys 2003* (2003) http://www.usenix.org/events/mobisys03/tech/zhuang.html pp. 129-144.

Phatak, D., Goff, T., et al., "IP-in-IP tunneling to enable the simultaneous use of multiple IP interfaces for network level connection striping," Department of Computer Science and Electrical Engineering, University of Maryland Baltimore County (UMBC) Mar. 2003, pp. 787-804.

Phatak, D., Goff, T., et al., "Leveraging extended-multi-homing for security by spreading identity," Computer Science and Electrical Engineering Dept., University of Maryland Baltimore County (UMBC), Apr. 2005, pp. 1-22.

Estrin, D., et al. "A Unified Approach to Inter-Domain Routing", Network Working Group, Request for Comments: 1322, May 1992, pp. 1-38.

\* cited by examiner

SPREAD IDENTITY COMMUNICATIONS ARCHITECTURE

CROSS-REFERENCE TO RELATED APPLICATION(S)

This application claims benefit of U.S. Provisional Application No. 60/947,413, entitled "SPREAD IDENTITY COMMUNICATIONS ARCHITECTURE," filed on Jun. 30, 2007 and U.S. Provisional Application No. 60/896,819, entitled "SPREAD IDENTITY (SI) MECHANISMS FOR SECURITY AND PERFORMANCE ENHANCEMENT," filed on Mar. 23, 2007.

BACKGROUND

1. Field of the Invention

The present invention relates generally to techniques for pooling identities and dynamically binding individual ones of the pooled identities to information transactions or segments thereof and, in particular, to techniques for dynamically binding real, routable internetworking addresses from a managed pool thereof to network connections, segments or even individual packets thereof.

2. Description of the Related Art

From its beginnings as a research collaboration tool used by a comparative handful of students and scientists, the Internet has become a nearly ubiquitous communication tool connecting people around the globe. Each day, individuals, businesses, and governments making increasing demands for Internet resources. As they do so, a large (but finite) set of identifiers—addresses—is depleted. For example, as numbers of wireless and wired network devices and services continue their explosive growth, even ordinary individuals use numerous devices, be they traditional computers, mobile phones, media players, digital entertainment systems or even appliances for which networked data communication is (or will be) available.

At the same time, the vulnerability of networked systems, configurations, software and information codings and protocols to unauthorized access or use have become widely recognized, at least by information security professionals. In general, these vulnerabilities can range from minor annoyances to critical national security risks. Today, given the ubiquitous nature of internet communications and the value of information and transactions hosted on the public internet, vulnerabilities are discovered and exploited at alarming rates. Automated tools facilitate the probing of systems and discovery of vulnerable systems and configurations. Once vulnerabilities are identified, exploits can be globally disseminated and rapidly deployed.

Network address translation (NAT) techniques have long been employed in devices (e.g., firewalls, routers or computers) that sit between an internal network and the rest of the world. In general, NAT implementations can employ static or dynamic mappings of "internal addresses" to "external addresses." In perhaps the most widely adopted configurations, a port-level multiplexed NAT device overloads outgoing traffic originating from multiple internal addresses onto a single apparent external address, using a port assignment to index an address translation table that records the port mapping and allows return path communications to be mapped (at the NAT device) and directed to the actual internal address of the originator.

Conventional NAT techniques are well understood in the art, see generally RFC1631 (describing NAT); RFC1918 (allocating non-routable address ranges for private internets); and How NAT Works, Document ID 6450 (2006) (archived at http://www.cisco.com/warp/public/556/nat-cisco.pdf), and have provided an efficient mechanism for limiting the need to assign real routable addresses to an ever expanding population of clients, while affording certain nodes that reside behind a NAT device a significant degree of isolation from external threats.

Unfortunately, conventional NAT techniques have done little to mitigate exposure of hosts or services to threats such as those posed by abnormal/anomalous data flows, undesired exfiltration of information, spread of malware/worms on local/internal networks, distributed denial of service (DDOS) attacks, traceback to sources of malicious flows, etc. Improved techniques are desired.

SUMMARY

It has been discovered that real routable external addresses may be pooled rather than assigned to nodes and may be dynamically bound to connections by a proxy or gateway device in ways that spread apparent identity of individual nodes across multiple of the external addresses. In general, these spread identity techniques may be employed at one end or the other of a connection, as well as at both ends. In a typical double-ended configuration, the architecture and associated techniques provide "double-blindfolding," wherein true identities (addresses) of communicating peers are always hidden from each other. In some double-ended configurations, dynamic binding may be employed at a fine level of granularity, for instance allowing individual packets associated with given connection to bear different apparent source addresses and/or different apparent destination addresses. In some single-ended configurations, a spread identity proxy is interposed between an information server and a plurality of requestors. The proxy redirects individual inbound connection requests for information from the information server to distinct addresses of a pool and establishes corresponding network address translations thereby dynamically spreading identity of the information server across multiple distinct addresses of the pool.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
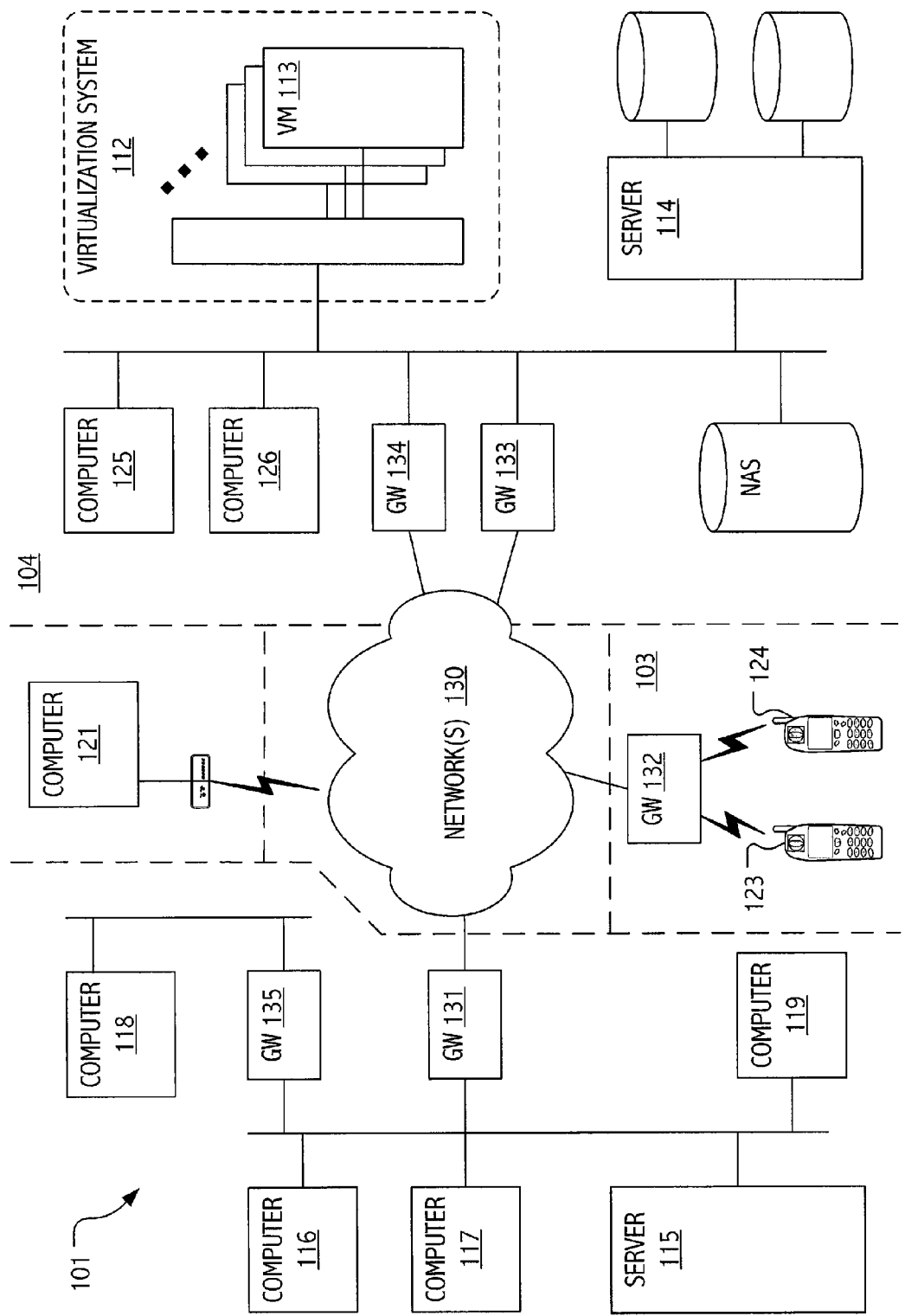
FIG. 1 depicts an exemplary network in which various techniques of the present invention may be employed.

Techniques have been developed for dynamically spreading the apparent identities of objects across multiple externally-valid or externally-recognizable identities in a networked communication system. Typically, the objects are nodes (e.g., computers, servers, devices or virtualizations thereof) in the network and externally valid identities include real, routable addresses (e.g., registered IPv4- or IPv6-type internet addresses). In some realizations of the developed techniques, spread identity gateways (SIGs) or spread identity proxies (SiPs) are employed to transparently coordinate the dynamic binding of external identities with internal nodes in a private or stub network and to coordinate changes in those bindings. In general, a multiplicity of external identities may be dynamically bound to a given node using a spread-identity network address translation (SI-NAT) technique. Building on a capability to bind a given node to not just one, but rather to a multiplicity of identities, certain novel strategies have been developed. As a general proposition, identities may correspond to individuals, objects, entities, transactions, etc. The techniques described herein may be deployed to deliberately spread the identities of hosts and then leverage the name/identity-resolution step as a "token granting" process which, in turn, facilitates extremely fast anomaly detection, multi-level multi-pronged robust defenses and offenses against distributed denial of service (DDOS) attacks, significantly enhanced network traceback, while simultaneously and resolving the address scarcity and simplifying tagging/marking of flows and the control plane at large. The net result can be a substantial enhancement in security.

In general, these spread identity techniques may be employed at one end or the other of a connection, or at both ends. In a typical double-ended configuration, the communications architecture and associated techniques can provide "double-blindfolding," wherein true identities (addresses) of communicating end-node peers are always hidden from each other. By pooling available external addresses, and then spreading node identity across multiple of the external (pooled) addresses and, in some cases, by allowing an SI-NAT mechanism to overload multiple internal nodes on a given external address, some embodiments in accordance with the present invention can provide DDOS mitigation, edge-to-edge traceability with anonymity of the end-hosts and/or address reuse.

For purposes of illustration and completeness, double-ended configurations are explained first, although based on the description herein, persons of ordinary skill in the art will appreciate that invented techniques may also be employed in single-ended configurations. In some embodiments, a proxy providing SI-NAT functionality may be deployed at one end of a communication topology without corresponding SI-NAT functionality at the other end. Additionally, a first proxy, server, gateway, etc. (or a combination thereof) that provides SI-NAT functionality may be employed in configurations where, if peer-end SI-NAT functionality does exist (e.g., in the form of another proxy, server, gateway, etc.), that peer-end SI-NAT functionality is not necessarily within the possession, custody or control of the organization or party that employs the first proxy, server or gateway. In other words, spread identity mechanisms described herein operate even if one of the peer-ends of a communication is controlled by a hostile adversary.

In embodiments configured for use in double-ended operation, dynamic binding may be employed at a fine level of granularity. For instance, in some embodiments in accordance with the present invention, individual packets associated with given connection may bear different apparent source addresses and/or different apparent destination addresses. In embodiments configured for single-ended operation, binding may instead be provided on a per-connection basis.

In some configurations, name resolution facilities (e.g., a DNS service, directory service or the like) can be augmented to spread identities and, depending on the implementation, may be integrated with functionality of respective spread-identity gateways (SIGs). The SIGs implement a protocol and identity binding mechanisms described herein whereby neither the source nor destination node in a communication may know a true routable address of the other. Rather, source and destination nodes are each dynamically mapped to external identities selected from respective pools thereof and network address translations are performed at the gateways to deliberately present fictitious (virtual) addresses as the apparent address of a communicating peer.

A given node may have a different dynamically mapped external identities for different connections, for different transmit windows, even for different units (e.g., packets) of a single connection or window thereof. As a result, at any a given time, a source or destination node may be mapped to multiple external identities and a given external identity may be mapped to multiple internal nodes. Spread-identity network address translations (SI-NAT) are performed at network edges (e.g., at gateways or proxies) and can deployed in a manner that provides complete compatibility with existing internetworking infrastructure. Building on the dynamic binding methods described herein, techniques have been developed for dynamically expanding and shrinking the sets of external identities dynamically bound to a given node in order to facilitate intrusion detection and mitigation.

In some exploitations, spread identity proxies (SIPs) are employed. As in the DNS-mediated spread identity gateway configurations, proxies manage respective pools of real routable addresses and maintain SI-NAT mappings, provide double-blindfolding whereby neither the source nor destination node in a communication may know a true routable address of the other. In the SIP configurations, conventional name resolution services can be employed and communications are employed for proxy-to-proxy negotiation and for communication of dynamically bound external identities and/or sequences thereof.

Finally, although double-ended configurations with peer gateways or proxies allow implementations to spread identity on a fine-grain, sub-connection-level basis, even single-ended configurations (e.g., a SIP only at the destination end) can provide many of the traceback, address reuse and DDOS attack mitigation benefits of the double-ended configurations. Accordingly, these aspects will be understood with reference to the double-ended configurations.

Likewise, spread identity mechanisms deployed only at the source end can also provide a substantial enhancement in security by thwarting IP-address based tracking (via cookies and/or other state information tokens), stealthy port scans and undesired rapid spread of malware (viruses/worms), and by mitigating unwanted exfiltration of information.

For concreteness, we describe implementations that are based on facilities, terminology and exploits typical of certain network protocols and/or services. For example, IPv4-type TCP/IP protocol conventions and services typical of current internet infrastructure (including e.g., conventional implementations of DNS and hypertext transfer protocol (HTTP) services) provide a useful context for description of the developed SI-NAT techniques. That said, the SI-NAT techniques described herein are general to a wide variety of networking architectures including those that may be hereafter developed or deployed.

Consistent with the foregoing, FIG. 1 depicts an exemplary network in which various techniques of the present invention may be employed or exploited. In particular, multiple interconnected network segments are illustrated in a matter consistent with modern TCP/IP internetworking technology. Individual portions, e.g., corporate/campus network 101, wireless network 103, individual dial-up connected computer 121 and information server enterprise 104 are interconnected with a global internet, illustrated as networks 130, using appropriate internetworking devices, shown as gateways 131, 132, 133, 134 and 135. In general, any of the illustrated end nodes, e.g., servers 114 and 115, virtual machines 113 of virtualization system 112, computers 116, 117, 118, 119, 121, 125 and 126, or wireless devices 123 and 124 may be dynamically bound to real routable addresses allocated from managed pools thereof using SI-NAT techniques such as described herein. In this regard, any of the illustrated gateways 131, 132, 133, 134 and 135, will be understood to constitute a possible locus for spread-identity gateway or proxy functionality described herein.

When end-to-end communications are discussed herein, persons of skill in the art will understand that as encompassing communications from one end node (e.g., wireless device 123, server 115 or computer 116) to another (e.g., server 114, VM 113 or computer 125) traversing intermediate network segments and gateways (whether or not explicitly shown). In general, some or all of the illustrated gateways (gateways 131, 132, 133, 134 and 135) may implement SI-NAT techniques as described herein. The illustration of FIG. 1 is meant to be inclusive; however, embodiments in accordance with the present invention are not necessarily limited to devices, connectivity and topologies illustrated. Instead, based on the description herein, persons of skill in the art will appreciate applications of the present invention to similar and dissimilar networks and to networks hereafter developed.

It should be noted that, although techniques are illustrated largely in the context of physical nodes and devices, distinctions between conventional hardware and virtualizations thereof may not be meaningful. Indeed, given the widespread deployment of virtualization technology in modern computing environments, the descriptions herein of servers, clients, gateways, proxies and other nodes will be understood to apply equally to physical devices and virtualizations thereof supported on underlying hardware. For example, virtualization system 112 is illustrative of server consolidation deployments of virtualization technology in which servers are exposed as virtual machines (e.g., VM 113). Accordingly, the set of end nodes for which one or more gateways (e.g., gateway 134, 133 or both) spread external identities may include both virtual nodes (e.g., VM 113) and conventional hardware nodes (e.g., server 114).

In view of the foregoing and without limitation on the range of underlying implementations of spread-identity network address translation techniques that may be employed in any particular realization of the present invention, we describe our techniques primarily in the context of certain exemplary realizations. Based on these exemplary realizations, and on the claims that follow, persons of ordinary skill in the art will appreciate a broad range of suitable implementations and exploitations.

Spread Identity Communications, Generally

Spread identity is a metaconcept that is widely applicable to a variety of information systems problems. Specifically, relative to certain internet related embodiments of the present invention, spread identity techniques facilitate solutions that provide:

Ultrafast detection of abnormal behavior;
IP address reuse, thereby addressing IPv4 address scarcity challenges;
Network attack traceback even in the case of single packet attacks
Proactive traceback;
Detection and mitigation of distributed denial of service (DDOS) attacks;
Identity baiting to, in essence, herd the attackers into a portion of the name space;
Simplifying the control plane (e.g., the routers, DNS servers and other entities/services that control the IP packet routing and other vital functions of the Internet) through use of dynamically bound addresses as a "markers" or "tokens" for packet, connection or flow;
Enhancing overall security is enhanced by mitigating stealthy port scans, teardrop attacks, etc.; and
Managing and/or mitigating risks of exfiltration of information through SI-NAT based techniques for tagging, intercepting, isolating and/or misdirecting suspect flows.

Exploitations of the present invention, including exploitations that support information security strategies in accordance with one or more of the foregoing, will be understood in the context of various gateway and/or SI-proxy implementations and associated communications architectures that provide SI-NAT translations.

In the proposed architecture, real routable addresses assigned to an organization/autonomous system are "pooled" together and typically not assigned to machines (or more generally, nodes) internal to the organization. Instances of such pools are henceforth referred to as identity pools or IDPs. Identities (i.e., real routable addresses) bound to internal nodes (that enable routing within the internal network) are completely arbitrary, as the architecture cleanly separates the internal and external (real-routable) name spaces. Note that addresses from an IDP are dynamically bound to internal nodes for purposes of a connection or other non-persistent unit of communication, e.g., a transmit window or packet.

As a baseline, consider user1 logged on to his machine (example.cs.umbc.edu) which is statically or dynamically assigned one of the University of Maryland's real routable addresses. Say he wants access content from the web-site of the CISE directorate in National Science Foundation (www-.cise.nsf.gov). As is conventional, web server could be assigned a real-routable IP address 128.150.4.108. Now suppose user2 sitting at a networking technology company in California wants to access content from the Engineering Directorate at the same time as user1 is accessing www-.cise.nsf.gov. The Engineering Directorate has its own web server www.eng.nsf.gov (which could be assigned the real routable address 128.150.4.21).

In a networking scheme that implements some of the SI-NAT techniques described herein, at least a subset of the addresses assigned to the NSF could be held in an identity pool (IDP) and dynamically assigned to connections. Accordingly, in a SI-NAT implementation, if user1 from Maryland requests a connection to www.cise.nsf.gov, the apparent (real routable) address dynamically bound and returned in accordance with an SI-NAT translation could be 129.150.1.1. If, at roughly the same time, user2 from California requests content from both www.eng.nsf.gov and www.cise.nsf.gov, the same real routable address 129.150.1.1 could, in accordance with another SI-NAT translation, be dynamically bound and returned for the first node (www.eng.nsf.gov), while a different real routable address 129.150.1.2 could be dynamically bound and returned for the second node (www.cise.nsf.gov). Thus, the same node (i.e., www.cise.nsf.gov) can have multiple apparent addresses (i.e., 129.150.1.1 and 129.150.1.2) at the same time, and the same single apparent (routable) IP address 129.150.1.1 can be simultaneously allocated to two real hosts (i.e., www.cise.nsf.gov and www.eng.nsf.gov). This mapping between real identities of the destination nodes (i.e., www.cise.nsf.gov and www.eng.nsf.gov) and the apparent identities (i.e., the routable IP addresses) appears as a "many-to-many" mapping that adds to anonymity and security.

Thus, the same real routable address (129.150.1.1) could be dynamically bound for respective communications destined for two different physical nodes (i.e., user1's access to www.cise.nsf.gov and user2's access to www.eng.nsf.gov), while different real routable address (i.e., 129.150.1.1 and 129.150.1.2) could be dynamically bound for respective communications (albeit from differing sources) destined for the same physical node. The multiplexing described above can be implemented using spread-identity (SI) adaptations of widely employed network-address translation (NAT) techniques. In double-ended exploitations, source nodes (e.g., user1's node in Maryland and user2's node in California) can be similarly bound (dynamically) to real routable addresses of a respective identity pool. In such exploitations, SI-NAT techniques are employed at both ends of the communication.

A significant aspect of some exploitations of the SI-NAT mechanisms described herein is that they enable different packets within the same connection to have different source and/or destination addresses. In fact, late, dynamic binding can be applied at any level of granularity. For instance, individual packets communicated in accordance with a connection could have a different source and/or destination address. Alternatively, the destination address could be changed after transmitting all the segments within a TCP transmit window. In any case, the SI-NAT framework described herein allows these dynamic binding decisions to be made (or at least effectuated) on-the-fly, in a manner completely transparent to the peer-end hosts. The specific algorithms that are employed to dynamically bind addresses to connections, packets or other communication units can be adapted to achieve a variety of goals such as:

Efficient, and potentially unlimited, address reuse;
Network (i.e., IDP-to-IDP) traceback;
Anomaly detection; and
Mitigation of DDOS attacks.

In general, double-ended embodiments of the SI-NAT architecture provide "double-blindfolding" wherein the true internet addresses (identities) of communicating peers are always hidden from each other. The end systems talk to "virtual" addresses as now explained with respect to certain exemplary communications architectures.

Exemplary Communications Architectures

Figure 2:
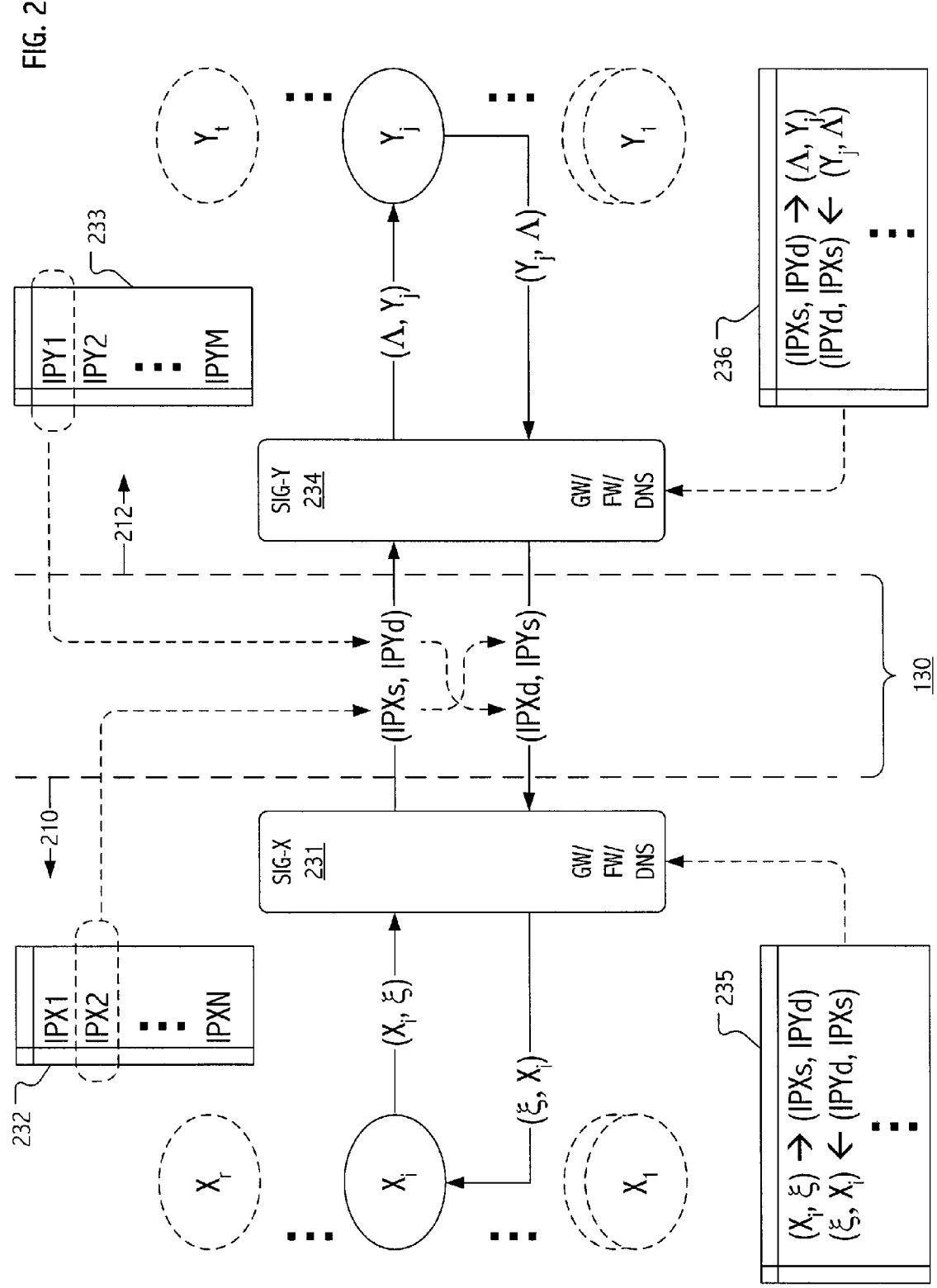
FIG. 2 depicts a communications architecture that includes spread-identity gateways in accordance with some embodiments of the present invention.

FIG. 2 depicts a communications architecture that includes spread-identity gateways in accordance with some embodiments of the present invention. In particular, FIG. 2 depicts end-to-end communications between a node $X_i$ of a gateway delimited network segment 211 and a node $Y_j$ of another gateway delimited network segment 212. Spread-identity gateways, SIG-X 231 and SIG-Y 234, establish and manage dynamic bindings of real, routable external addresses suitable for routing in network 130. In particular, SIG-X 231 manages a pool 232 of external identities (IPX1, IPX2 . . . IPXn) for dynamic bindings relative to respective connections involving nodes $X_1 \ldots X_r$. Similarly, SIG-Y 234 manages a pool 233 of external identities (IPY1, IPY2 . . . IPYm) for dynamic bindings relative to respective connections involving nodes $Y_1 \ldots Y_r$.

In the illustration of FIG. 2, respective spread-identity gateways, SIG-X 231 and SIG-Y 234 subsume perimeter routing (PR), firewall (FW) and domain name service (DNS) proxying and network address translation (NAT), although persons of skill in the are will recognize that such functionality may be distributed amongst a variety of cooperative components, if desired. Relative to NAT functionality, tables 235 and 236 encode operant translations between internal and external source/destination pairs. Thus, in correspondence with a current dynamic binding of pooled identity IPX2 as the current external identity for internal node $X_i$ relative to a connection (or as described elsewhere, even relative to an individual packet communicated in the course of that connection) with a node network segment 212, table 235 encodes relevant address translations. In particular, table 235 encodes a mapping that establishes that for a packet having $X_i$ and $\xi$ as respective source and destination identifiers, SIG-X 231 may translate source and destination identifiers to IPsource=IPX2 and IPdestination=IPY1 for presentation and routing node $X_i$'s outbound in the external network 130. Table 235 also encodes a reciprocal mapping that establishes that for a packet having IPsource=IPY1 and IPdestination=IPX2 as respective source and destination identifiers, SIG-X 231 may translate source and destination identifiers to $\xi$ and $X_i$ for correctly routing the inbound traffic destined for node $X_i$ in internal (or stub) network 210. In other words, table 235 encodes the following NAT translations:

$(X_i,\xi) \rightarrow (\text{IPXs,IPYd})$ (outbound/egress SI-NAT mapping)

$(\xi,X_i) \leftarrow (\text{IPYd,IPXs})$ (inbound/ingress SI-NAT mapping)

between namespaces of internal network 210 and external network 130. Similarly, table 236 encodes the following NAT translations:

$(\text{IPXs,IPYd}) \rightarrow (\Lambda,Y_j)$ $(\text{IPYd,IPXs}) \leftarrow (Y_j,\Lambda)$ between namespaces of external network 130 and internal network 212. The only constraint the virtual addresses $\xi$ must satisfy is that they be "outside" (i.e., not included in) the internal name space of autonomous system X. Likewise, virtual addresses $\Lambda$ must not be in the internal name-space of Y. This can be easily achieved in many different ways. The virtual addresses can also be pooled and reused arbitrarily as and when required.

Although only those translations corresponding to current dynamic bindings for the single illustrated connection between internal node $X_i$ of network 210 and internal node $Y_j$ of network 212 are illustrated in FIG. 2, as is implicit in the concept of spread identity network address translation, other translations (not specifically shown) for other connections (or packets) and corresponding dynamic bindings to other external identities will also be encoded in respective entries of tables 235 and 236. In general, tuples involving dynamically bound external addresses serve as identifiers in the translation tables. Therefore, consistent with the SI-NAT paradigm, other connections involving internal node $X_i$ may be bound to other external addresses from identity pool 232 as long as the connections involve a different other end external address.

Similarly, connections involving other internal nodes $X_1 \ldots X_r$ may be bound to the same external address (e.g., IPX2) as long as they involve a different other end external address. Thus, a single real routable address in the pool (say address IPX1) could be used to support an arbitrary number of incoming connections (i.e., can be used as a destination address) as long as the source-addresses of the concurrent connections are distinct. In addition, the same IPX1 can simultaneously support (i.e., get used as a source address in) another arbitrary number of concurrent outbound connections as along as their destination addresses are mutually distinct. Note that "distinctness" requirement applies only within the set of concurrent source address and separately within the set of concurrent destinations. Arbitrary overlaps amongst source and destination address of the opposite peer end are permissible.

We now turn to FIGS. 3A-3D to explain how spread-identity network address translations (SI-NATs) are created during the course of connection.

Figure 3A:
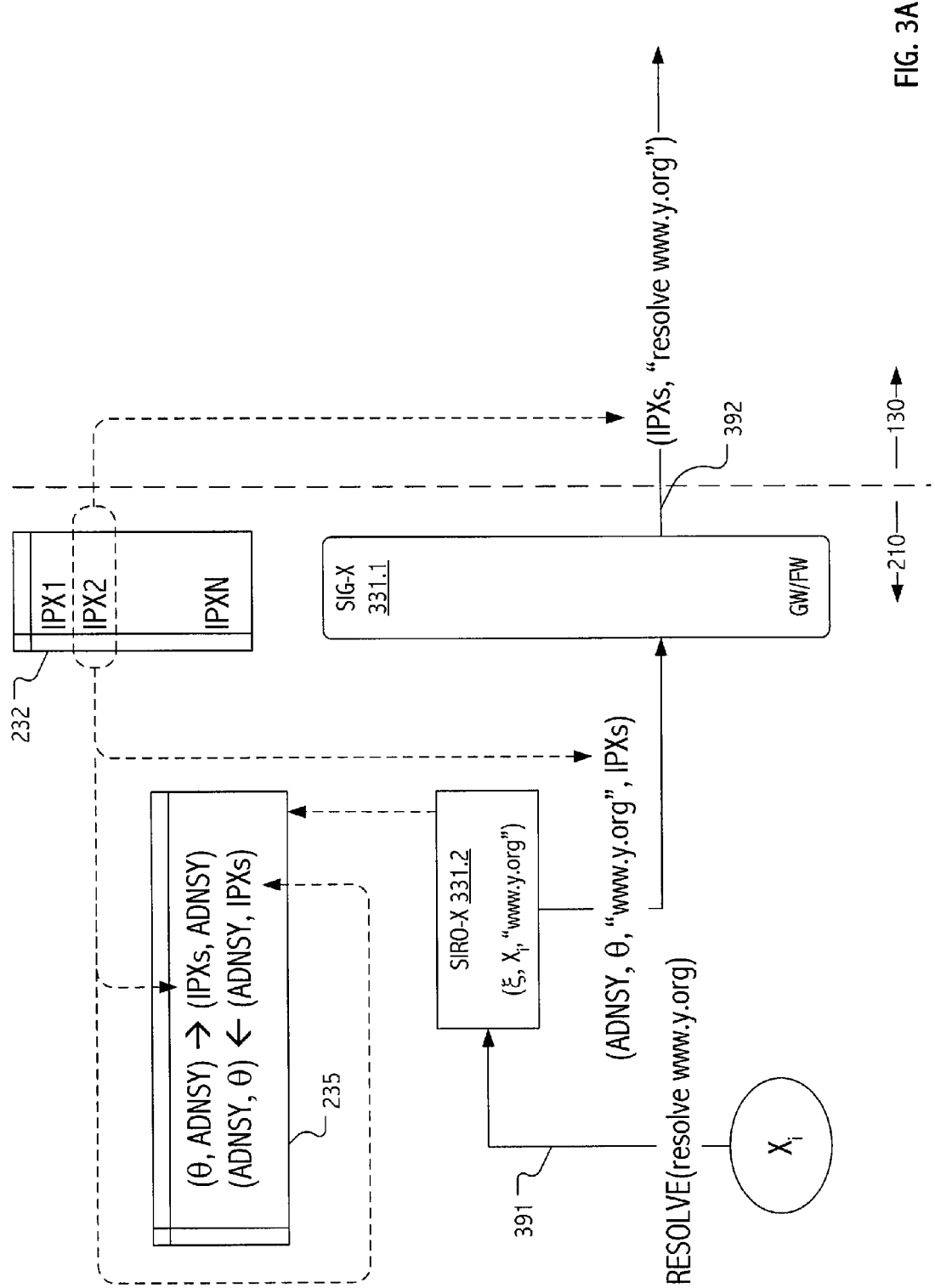
FIGS. 3A, 3B, 3C and 3D depict a progression of states illustrating dynamic DNS-mediated binding of an identity in accordance with some spread-identity network address translation (SI-NAT) techniques of the present invention.

FIGS. 3A, 3B, 3C and 3D depict a progression of states illustrating dynamic DNS-mediated binding of an identity in accordance with some spread-identity network address translation (SI-NAT) techniques of the present invention. In particular, FIG. 3A depicts interactions within local network 210 corresponding to an outbound connection request from node $X_i$ destined for the resource corresponding to logical name www.y.org.

Local node $X_i$ transmits a name resolution request (391) which is received by a particular spread-identity resolver-outbound (SIRO-X) 331.2. For example, by setting name-resolver entries for entities within organization X to point to SIRO-X, DNS requests originating from within X can be directed to a dedicated server SIRO-X. Note that address mapping and SI-NAT handling components of SIG-X 231 (see FIG. 2) are illustrated separately as SIRO-X 331.2 and SIG-X 331.1 for ease of description. Of course, in some implementations, functionality may be combined.

Based on the node's internal address/identity $X_i$ and target name "y.org," SIRO-X 331.2 generates a virtual address t and another address IPX2 from identity pool 232 of real-routable addresses. A hash functions is one way to generate these addresses and, based on the description herein, persons of skill in the art will recognize other suitable index/mapping mechanisms that can be employed. Optionally, SIRO-X could use additional parameters such as a date/timestamp or more elaborate "state" information in the mapping. IPXs=IPX2 is the address that is included in the "source address" field in the DNS query.

Assuming SIRO-X has internal address θ, it establishes NAT entries:

(θ,ADNSY)→(IPX2,ADNSY)(outbound mapping)

(ADNSY,θ)←(ADNSY,IPX2)(inbound mapping)

where ADNSY is the real routable address of the spread identity resolver-internal (SIRI-Y) 334.2. SIRI-Y 334.2 subsumes functionality of the authoritative name server for organization Y. The outbound NAT entry ensures that the name-resolution server at Y (i.e., SIRI-Y) sees IPX2 which is the translated identity of the actual source $X_i$. The inbound NAT entry enables SIRO-X to receive the DNS response.

SIRO-X sends the DNS query to the authoritative name server for domain Y. Given ever expanding memory capacities, it should be possible to locally cache a list of authoritative name servers for frequently used and topologically local domains. If need be, SIRO-X can obtain the address of the root server via hierarchical/recursive queries. Note that SIRO server is "outside" (i.e., not included in) the external DNS hierarchy. In fact, SIRO-X augments existing DNS infrastructure by maintaining the list of authoritative names servers (so that the load on real DNS is lighter).

At this point, initial SI-NAT translations are incomplete pending resolution (and dynamic binding) of an opposing end address and table 235 encodes the following NAT translations:

(θ,ADNSY)→(IPX2,ADNSY)(outbound)

(ADNSY,θ)←(ADNSY,IPX2)(inbound)

In other words, real routable destination address IPYd is represented as a placeholder and the previously generated hash ξ and local address $X_i$ have yet to be introduced into the left hand side of the mappings. Depending on the implementation, placeholders and the association hash ξ and local address $X_i$ may be encoded using facilities of NAT table 235 or using some other store or mechanism.

Figure 3B:
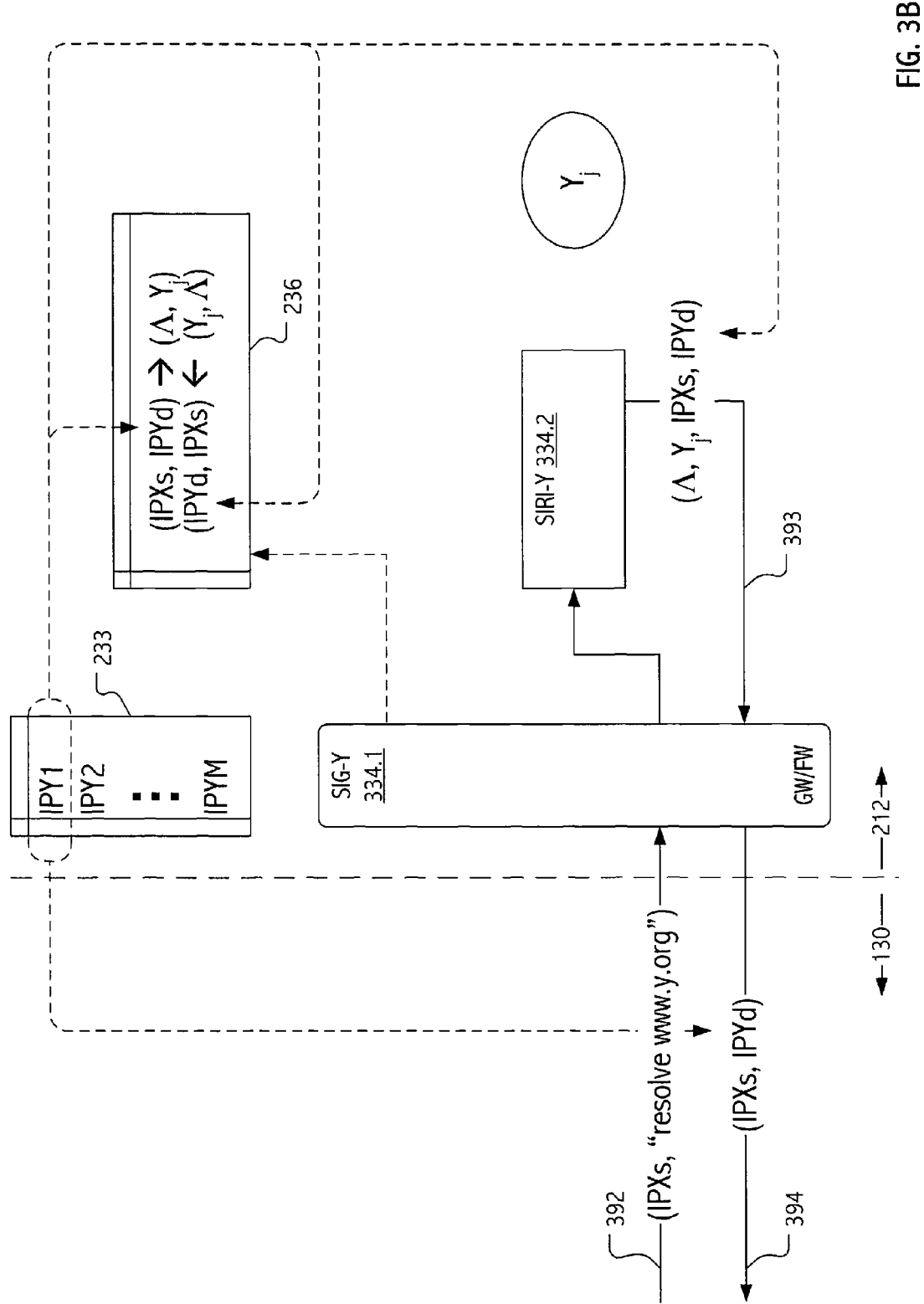

FIG. 3B depicts a corresponding set of interactions within local network 212. As before, an SI-DNS proxy that dynamically reveals/associates real routable addresses in response to inbound name resolution requests and an SI-NAT handling components, here SIG-Y 234 (recall FIG. 2) are illustrated separately as SIRI-Y 334.2 and SIG-Y 334.1 although they may be combined in some implementations, if desired. DNS resolution request (392) is received by IDNS-Y proxy 334.2, which resolves www.y.org to internal node $Y_j$ for which a real, routable destination address IPYd=IPY1 is dynamically revealed from identity pool 233. At this point, SI-NAT translations for the end-to-end connection between nodes $X_i$ and $Y_j$ are complete at the destination end (i.e., at organization Y) and table 236 is updated to encode the following NAT translations:

(IPXs,IPYd)→(Λ,$Y_j$)

(IPYd,IPXs)←($Y_j$,Λ)

Resolution (394) is of the DNS request, apparently from IPYd=IPY1 is returned via network 130.

Figure 3C:
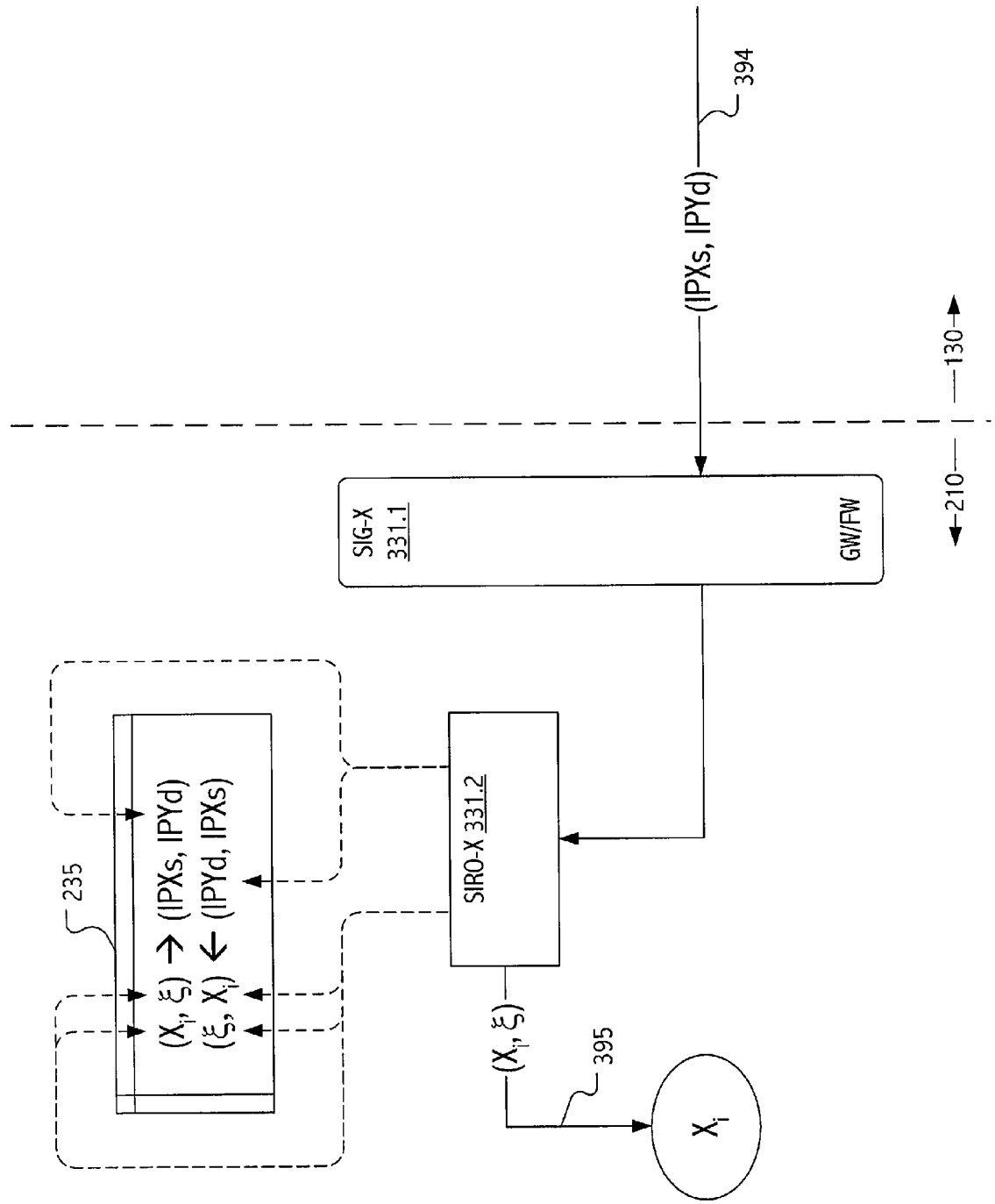

FIG. 3C depicts corresponding interactions within local network 210 responsive to DNS resolution 394. When the DNS response reaches SIRO-X 331.2, it checks for error and/or any "throttle transmission" flags the destination server (SIRI-Y 334.2) may have set. Assuming none of these extraordinary situations arises, the SIRO-X extracts the destination identity/handle/address and replaces the temporary NAT entries described above with NAT entries for the impending data exchange between $X_i$ and $Y_j$. At this point, table 235 encodes the following NAT translations:

($X_i$,ξ)→(IPXs,IPYd)

(ξ,$X_i$)←(IPYd,IPXs)

A result of the DNS resolution, mapped in accordance with the current SI-NAT state, is supplied (395) to node $X_i$ as apparent/blindfolding/virtual destination address ξ.

Figure 3D:
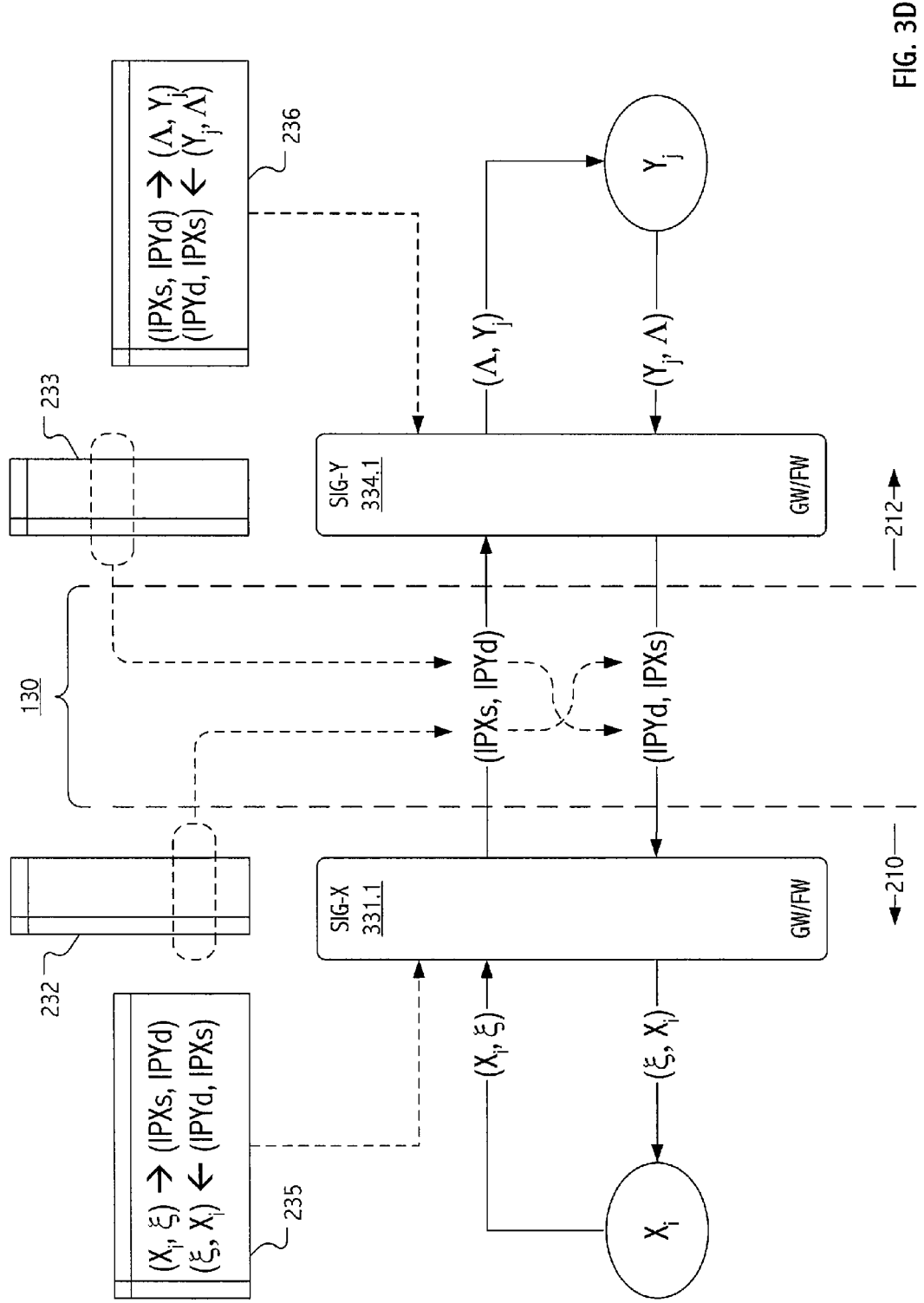

Accordingly, as now illustrated in FIG. 3D, node $X_i$ communicates with node $Y_j$ without any knowledge of node $Y_j$'s actual address. Instead, from the perspective of node $X_i$, the connection is with some blindfolding/virtual address ξ. Similarly, from the perspective of node $Y_j$, its connection is with another blindfolding address Λ and node $Y_j$ has no knowledge of node $X_i$'s actual address. Apparent real, routable addresses for communications over external network(s) 130 (e.g., the public internet) are IPXs and IPYd as currently and dynamically bound to particular addresses of respective pools managed by SIRI-X 331.1 and SHI-Y 334.1, respectively. Dynamic bindings may change (as described herein); however, in any case, both ends of the connection are "blindfolded" with respect to each other.

So, what happens if the application at end node $X_i$ caches recently resolved address ξ for destination "y.org" and a short time after the first successful communication with "y.org," it directly tries to communicate with that address ξ for a new connection? In this case, there is no explicit name-resolution query by the end-node $X_i$. Since there is no SI-NAT entry (the original SI-NAT entries got deleted after the first connection ended), the connection request packet will token-mismatch at SIG-X. All such token mismatched requests are forwarded to SIRI-X and cause SIRI-X to acquire a dynamic destination address for "y.org."

Does this mean extra DNS traffic? No! Actually, the SIRO servers are not part of external DNS hierarchy at all. Those servers augment existing DNS infrastructure. Note that when SIRO-X receives a token mismatched packet with (src,dst) equal to $(X_i, \xi)$, it need not send an explicit DNS query to the destination. Instead, it can send a special type of SYN packet that contains (i) IPXs, the translated identity of the source (ii) SIRO's authentication credentials and (iii) optionally a challenge to the destination SIRI server.

Now the SIRI-Y verifies the credentials, sends back a response including the dynamic address IPYd and creates the NAT entry (aka token) at SIG-Y. SIRI-X receives the response from SIRI-Y, verifies it and then creates the NAT entries (tokens) at SIG-X and sends the response (NATed) to $X_i$. From here on the communication is as usual.

Figure 4:
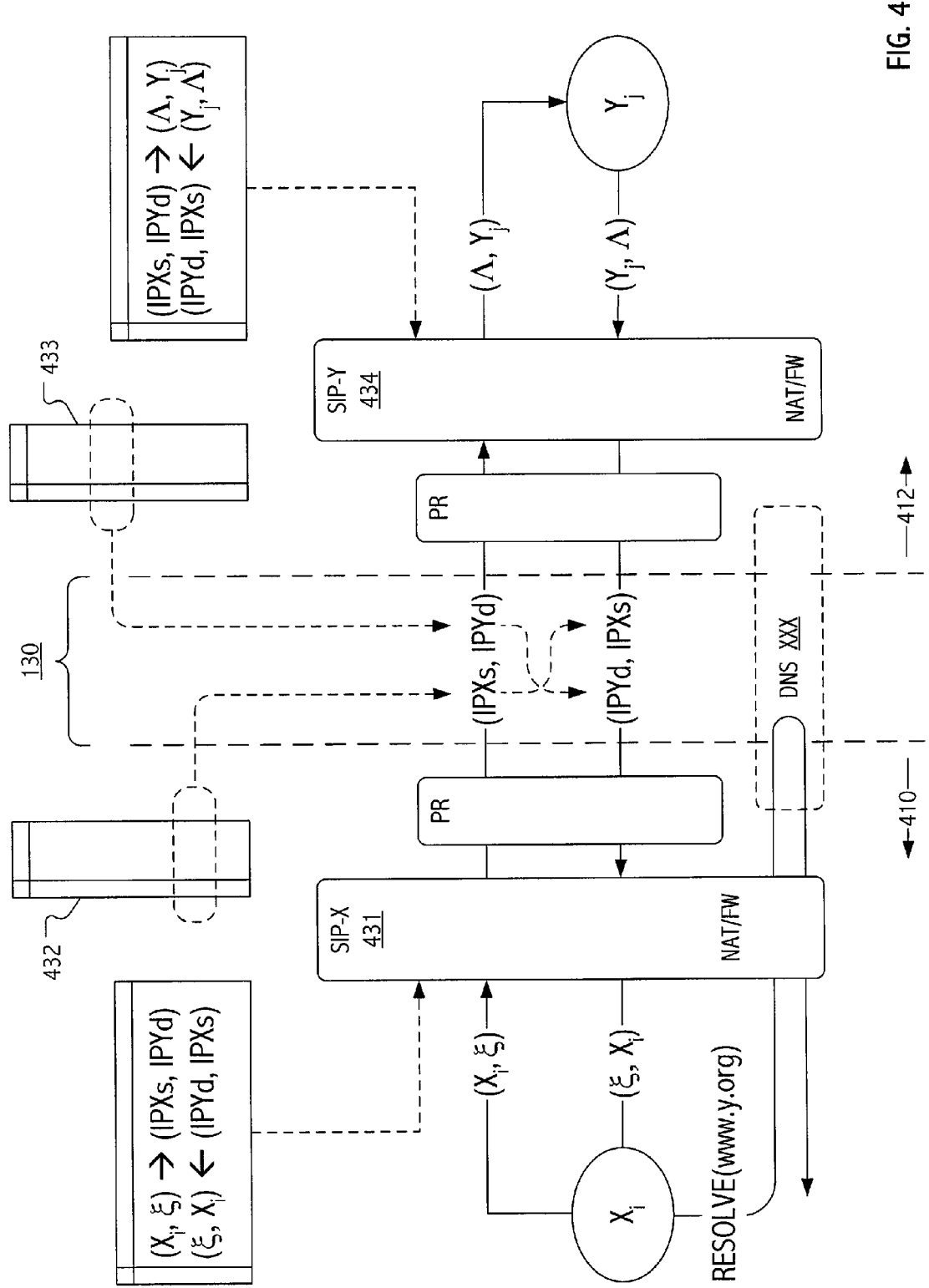
FIG. 4 depicts a communications architecture that includes spread-identity proxies in accordance with some embodiments of the present invention.

FIG. 4 depicts a communications architecture that includes spread-identity proxies in accordance with some embodiments of the present invention. The illustrated communications architecture operates in a manner analogous to that illustrated in FIG. 3D; however, unlike the previously illustrated variant, name resolution is entirely conventional and is handled using existing facilities shown as DNS infrastructure 451. In this variant, DNS requests and responses need not be harnessed to spread identity.

Name resolution request 496 is proxied by spread-identity proxy SIP-X 431, which in turn obtains a real-routable destination address (e.g., IPY) for www.y.org, and passes on an apparent address ξ to node $X_i$. Node $X_i$ then makes a connection request, again proxied by SIP-X 431 and dynamically bound to an apparent source address IPXs from identity pool 432. As before, the SI-NAT mechanism maintains translation information pending destination.

Node $X_i$'s connection request, proxied by SIP-X 431 and apparently from external address IPXs, is in turn received by opposing end spread-identity proxy SIP-Y 434. SIP-Y 434 dynamically binds an apparent address IPYd from its identity pool 433 and negotiates with SIP-X 431 to communicate back the dynamically bound address IPYd (or perhaps a sequence of dynamic bindings to be used for subsequent packets or transmit windows). Back communication can be handle in any of a variety of ways including piggybacking on ACKs or using a specialized proxy-to-proxy sideband protocol. In response, SIP-X 431 receives the dynamically bound destination address (or sequence thereof) and establishes or updates a pair of SI-NAT translation entries in table 435 as follows:

$(X_i, \xi) \rightarrow (IPXs, IPYd)$ $(\xi, X_i) \leftarrow (IPYd, IPXs)$

In any case, SIP-Y 434 passes the request (apparently from internal address Λ) on to node $Y_j$, and establishes a pair of SI-NAT translation entries in its table 436 accordingly:

$(IPXs, IPYd) \rightarrow (\Lambda, Y_j)$ $(IPYd, IPXs) \leftarrow (Y_j, \Lambda)$ Node $Y_j$ responds (to address Λ) and SIP-Y 434, in turn, passes the response to dynamically bound source address IPXs in accordance with the operative NAT mapping.

As with the previously described DNS-integrated gateway realizations, node $X_i$ communicates with node $Y_j$ without any knowledge of node $Y_j$'s actual address. Instead, from the perspective of node $X_i$, the connection is with a local address ξ. Similarly, from the perspective of node $Y_j$, its connection is with a local address Λ and node $Y_j$ is without any knowledge of node $X_i$'s actual address. Apparent real, routable addresses for communications over external network(s) 130 (e.g., the public internet) are IPXs and IPYd as currently and dynamically bound to particular addresses of respective pools managed by respective spread identity proxies. Dynamic bindings may change (as described herein); however, in any case, both ends of the connection are "blindfolded" with respect to each other.

Figure 5:
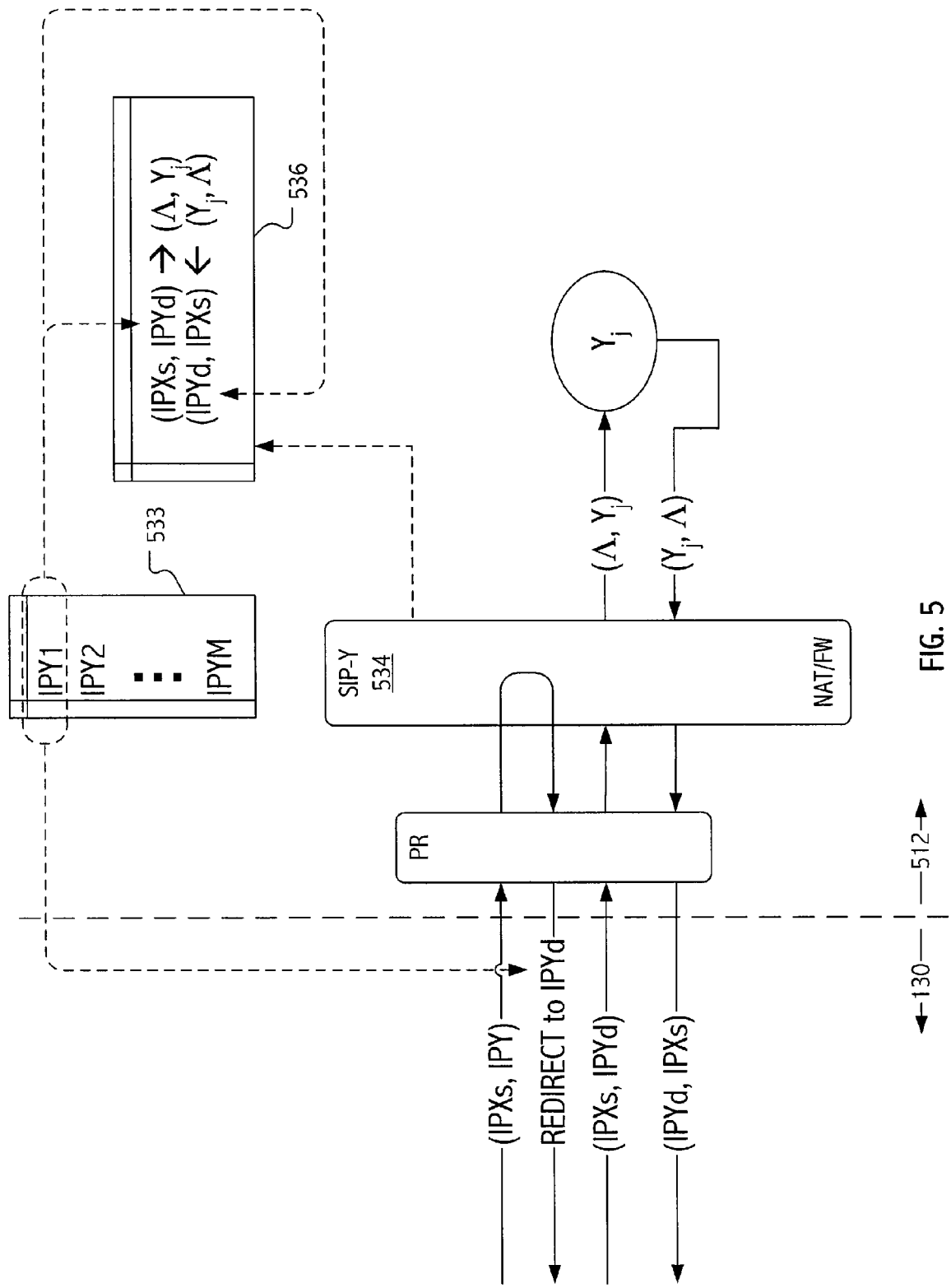
FIG. 5 depicts a portion of a communications architecture that employs a spread-identity proxy at a destination end of a connection in accordance with some embodiments of the present invention.

FIG. 5 depicts a portion of a communications architecture that employs a spread-identity proxy at a destination end of a connection in accordance with some embodiments of the present invention. The illustrated communications architecture operates in a manner somewhat analogous to that illustrated above with reference to FIGS. 3D and 4; however, unlike the previously illustrated variants, no source-side spread-identity NAT functionality is presumed. Indeed, FIG. 5 illustrates at least one SI-NAT configuration in which a unilateral single deployment of a spread-identity proxy affords most of the benefits of the more complete configurations described above.

Incoming protocol traffic 592 (e.g., an HTTP request) is received at spread-identity proxy SIP-Y 534, which in turn dynamically binds an apparent destination address IPYd=IPY1 from its identity pool 533 and correspondingly updates SI-NAT translation entries in table 536 as follows:

$(IPXs, IPYd) \rightarrow (\Lambda, Y_j)$ $(IPYd, IPXs) \leftarrow (Y_j, \Lambda)$ Then, to communicate back the dynamically bound address IPYd, SIP-Y 534 employs a protocol redirect response that causes the source of protocol traffic 592 to, instead, represent (594) its request to apparent destination IPYd. SIP-Y 534 passes the now redirected request (apparently from internal address Λ) on to node $Y_j$. Node $Y_j$ responds (to address Λ) and SIP-Y 534, in turn, passes the response to dynamically bound source address IPXs in accordance with the operative NAT mapping.

As with the previously described realizations, a source node communicates with node $Y_j$ without any knowledge of node $Y_j$'s actual address. From the perspective of node $Y_j$, its connection is with a local address A and node $Y_j$ is without any knowledge of the source node's actual address. Apparent real, routable addresses for communications over external network(s) 130 (e.g., the public internet) are IPYd as currently and dynamically bound to a particular address of identity pool 533 and IPXs. Dynamic bindings of IPYd may change (though typically on a connection by connection basis); however, in any case, end nodes are "blindfolded" with respect to each other.

Usage Examples

Using spread-identity techniques such as described above, a number of useful results can be achieved including reduction/elimination of address scarcity problems, quality of service (QoS) support, fast anomaly detection, distributed denial of service (DDOS) defense, simplified network traceback, end node privacy and overall improvements in security. We briefly summarize each, noting that any given embodiment of the present invention need not achieve all such results or even achieve any specific results in exactly the way summarized. Rather, persons of skill in the art will, based on the description herein, appreciate a wide range of embodiments consistent with the claims that follow.

Address Scarcity/QoS

In general, the techniques described above can be used to eliminate (or at least reduce) address scarcity problems and, provide a mechanism for managing QoS commitments. To illustrate (generally with respect to embodiments illustrated in FIGS. 2-5, assume that destination Y returns the real-routable address, say 1.2.3.4, in response to the query from node $X_i$. It could return the same address 1.2.3.4 in response to another query from another source Z (not specifically shown). In this case, the SI-NAT mechanism distinguishes inbound connections based on source-addresses. It is clear that one single real routable address could support any number of simultaneous inbound connections as long as the source addresses are distinct. To see the full extent of the flexibility, note that the same address 1.2.3.4 could be used as the source address in any number of outgoing connections (outbound from Y) as long as the destination addresses are distinct.

In the most abstract sense, if the gateway node is such that disconnecting that node splits the original network graph into disjoint graph then NATing in conjunction with dynamic address assignment makes an unlimited reuse of address feasible. For example, the same addresses used in the United States could be assigned in say Europe and Asia (with proper NATing at the perimeter). In this case, how does a packet originating in the United States know whether it is to be delivered to the 1.2.3.4 address dynamically bound in the United States or the 1.2.3.4 address dynamically bound in Europe or in Asia? The answer is straightforward: if the destination is in Europe, the blindfolding/virtual address returned is say $\xi_E$ and for Asia, the virtual address returned is say $\xi_A$. As long as these virtual addresses are outside the name space used in the United States, the routers in the United States keep forwarding them toward the perimeter router which has the appropriate NAT entry.

An interesting point is that now the addresses start to look like the frequencies used in a CDMA network, the same frequencies can be re-used in non-adjacent cells. By controlling the number of address allocated/deployed, addresses could be used as "bandwidth tokens/quotas." Table sizes in core routers will be smaller. the ability to dynamically NAT the addresses at each level (if needed) implies that the address space size is small which in turn implies that routers don't need to store too many destinations. In general, indirection, together with address pooling and spreading of identities can be leveraged toward Quality of Service.

Fast Anomaly Detection at the Source End

In general, even in deployments where SI mechanisms are provided simply within a subnetwork, significant benefits can accrue. Note that "blindfolding" addresses $\xi$ can be leveraged to trace the spread of viruses and/or groups of infected machines. For instance, a common scenario is where one node gets infected (say via social-engineering, i.e., by inducing the user to click on something). Once that node is "commandeered," the attackers typically look for other victim nodes in the same local network. Assume that the attacker has setup a "command post" at some chat site and the victims get their "orders" by periodically logging onto that chat-server. Even though the real routable address of the chat server may be constant, each individual node sees a different apparent address $\xi$ for the chat server. In fact, that $\xi$ is dynamic so that depending on the time of day, even the same node re-requesting the address might be given a different virtual address. If this fact is not recognized and one "local leader of infected nodes" instructs other bot nodes (victim nodes) to use the chat server address directly, it is a giveaway. In fact, this behavior facilitates a precise traceback of the node that passed on the address of the command ship (aka, the chat server) to which other nodes (because the blindfolding address are functions of the identities of the requesting nodes and optionally time).

The very fact that there is no communication without NAT entries implies that unwanted communications such as IP address based pings to find out if there is a victim node alive at that address (i.e., hunt for potentially vulnerable victim nodes), are completely gone. So, unless the attackers know the "Names" of the machines they cannot simply sniff for potentially vulnerable nodes. Likewise "port knocking" and other direct IP address based unwanted communications are thwarted.

IP addresses are widely used in cookies, which act as "state information tokens." By dynamically changing addresses, much of the current generation of malicious state tracking malware can be rendered useless. Indeed, based on the description herein, persons of ordinary skill in the art will recognize that, by virtualizing a few other parameters (such as processor serial numbers, MAC ids and whatever else constitutes a "hardware identifier"), unwanted tracking can be impeded.

The internal "name" assigned to a machine can be deliberately made distinct from the externally recognizable name. The hostname (assigned at boot time) can be made distinct from either of the above identifiers. Now even if malware tries to extract local hostname for future use, it is useless. Similarly, the above-described techniques can be leveraged to mitigate unwanted exfiltration of information.

In essence, the techniques described herein can be employed to deliberately render the blindfolding addresses dynamic (i.e., to "spread" them). The technique is particularly attractive because they spread identity addresses are temporary, fictitious address that are set up by the SIRO agent and can be any address outside the name-space of the source organization. The fictitious address are then leveraged for enhancing traceback, thwarted unwanted communications, and more generally, improving overall security.

Fast Anomaly Detection at the Destination End

In addition, the techniques described above can be used to facilitate fast anomaly detection via IP-level token matching. After each resolution request is processed, the pair (IPXs,IPYd)=(query-source-address,resolved-address)

gets added to the SI-NAT mapping table at the destination SI-gateway (SIG-Y). It can be effectively used as a "token" as illustrated in the following example.

Normal Client Behavior

Step 1: Node $X_i$ sends a name-resolution request (source address=IPXs). In response, it gets an address IPYd (one of the may that SIG-Y may dynamically reveal). The result is a 2-tuple or "token" (IPXs, IPYd).

Step 2: Node $X_i$ sends a data/connection request to address IPYd (or internal address ξ in double-ended configurations) and communication proceeds normally in accordance with the application layer protocols.

Abnormal Client Behavior Rendered Detectable by Token Matching

For a casual query, e.g., only a name resolution request, with no data/connection requests, detection can be achieved by expiring tokens that are not used in a temporally proximate connection request. For an unsolicited query, e.g., a data/connection request which is not preceded by a name resolution (or other SI-NAT translation creating) query, the source address will not appear in an SI-NAT entry. Similarly, if a source for which an SI-NAT translation exists sends a query (data/connection request) to another address, say IPYK, the destination address mismatch can be flagged as anomalous behavior.

Once an anomaly is identified, further action can be taken depending on the state of node $Y_j$. For example, it could re-direct a request to a challenge server in order to give genuine clients a chance to redeem themselves. Alternatively, or at least under heavy load conditions, SIG-Y gateway could simply filter off anomalous packets.

Distributed Denial of Service (DDOS) Defense

Several Robust DDOS Defense (DOSD) mechanisms are supported using techniques described above. For example,
  (DOSD-1) Rate-limit the number of DNS responses
  (DOSD-2) If a flurry of DNS queries indicates a DDOS attack then re-direct data requests to a challenge-response server to screen for humans in the loop (that should identify automated scripts thereby revealing the source as a "bot")
  (DOSD-3) If the bots don't care to make a DNS query their traffic will token mismatch (no SI-NAT entry) and can be filtered off. It never reaches the destination machine so resource consumption attacks like TCP-SYN floods and CGI floods are neutralized.
  (DOSD-4) As a last gasp the attackers try to clog the bandwidth. This is where the victim instructs the next hop router to set routes to some of its own addresses to NULL (temporarily "quench" address or "shrink" identity). For example, suppose all name resolution queries for y.org from source nodes in the US are shown IP addresses in set SI (which is a subset of the entire pool of addresses assigned to Y). Likewise all name resolution requests from nodes in say China get doled out the IP address from set S2 and sources from Brazil see addresses in S3. Now if under DDOS attack, then Y could selectively turn off all traffic flows say from Brazil by instructing the adjacent upstream router to temporarily set the route to S3 to NULL. The route(s) can be restored after the attack subsides. Note that in a DDOS attack, sources are distributed so filtering on source address is difficult or impossible. However, using the techniques described herein destination can temporarily quench its own address (i.e., shrink its identity) in a way that affects the desired set of source addresses.
  (DOSD-5) Attacks against a DNS server itself are symmetric (same amount of data in query/response) and are easy to defend since the DNS server itself sits behind the SIG-Y firewall. Multiple DNS server entries are allowed in the current DNS specification. So organization Y can reserve a subset of addresses specifically to spread the identity of the DNS server itself (so that in case of a query flood, it can quench addresses).

Fundamentally, SI-NAT based control over the address revealing process opens up many possibilities such as:
  Return a bot it's own address (so the future attack traffic never leaves the attack bot node).
  A perhaps more radical response is to take the fight back to the attackers. For example, one could return the bot each other's addresses, so they clobber each other.
  Send bots to honeypot traps (which can be a value added service provided by the ISPs) that keep the bots connected but idling with the minimum amount of data trickle needed to keep the TCP connection alive. The TCP stacks on the honeypots could be specifically tailored to keep the peer connected but idling by using various mechanisms built into TCP (for example frequently advertising 0 window size to send the peer into long backoffs).

Note that if SI mechanisms are deployed at both ends then flows can be quenched right at the source. Then rate limiting the DNS responses will ensure that the server never gets more connection requests than its capacity. The IP address returned by the Spread Identity Server at destination Y could itself serve as a "throttle" signal to the Spread Identity server at the source end. For example, using the following returned address coding:

```
if (returned address == IPXs)
    deny X_i       /* Host specific throttle */
(returned address == X's network-class address)
    deny X_l ... X_r      /* Throttle all hosts */
```

Of course any suitable coding scheme or protocol for negotiation/communication between SIG-X and SIG-Y may be employed.

Network Traceback

Traceback is the process of identifying the chain from victim-host to origin host given a single packet or a set of packets that have arrived at the victim node in the recent past. In general, while a wide variety of traceback techniques are known in the art, "good" traceback techniques tend to recognize that (i) end hosts cannot be relied upon for logging/auditing; rather, network entities must do most of the logging; (ii) content analysis is not typically useful as it can be easily defeated by padding, encryption, chaffing and other mechanisms; and (iii) as far as possible, routers should be left alone.

The spread-identity techniques described herein can facilitate traceback in ways that generally satisfy each of these goals. Note that the spread-identity gateways (e.g., SIG-X, SIG-Y) can simply log the NAT entries that correspond to SI dynamic bindings. These logs capture a complete history of who wanted to talk to whom at what time. Advantages of this SI-based traceback scheme include the following:
  Efficiency: The amount of information that is logged per communication can be extremely small. For example, only the three-tuple (src, dst, timestamp).
  Accuracy: It is as accurate as other methods: note that other more expensive methods such as hashing packet contents cannot provide anything more than connection history if the adversary uses obfuscation techniques such as encryption, chaffing, delaying etc., from hop-to-hop.
  Scalablity: Only source and destination gateways (e.g., SIG-X, SIG-Y) do the logging. Intermediate routers don't need to do anything.

Redundant: The logging is inherently redundant and harder to subvert. There are two entries that should match: one at the source-side SI gateway and another on the destination side gateway (like "double-entry book keeping"). Accordingly, SI-NAT based logging can be quite reliable as it does not depend on untrusted end hosts and it not dependent on a single entity.

Robustness: If a malicious gateway corrupts SI-logs the logs at the "other end" can detect this corruption. As a result, comparison of logs is a way to detect misbehaving gateways.

Note that even if the SI-NAT mechanisms are deployed only at the destination end, e.g., as described above and illustrated with reference to FIG. 5, or if source SI-NAT is deployed but is for some reason untrusted or compromised, traceback using SI translation logs still enables substantially better traceback than that feasible with most conventional techniques for the following reasons:

The identity of the last hop bot is necessarily revealed because an attacker must have the ability to receive the address returned by the DNS query (or other SI binding mechanism). As a result, an attacker must expose at least one zombie/stepping-stone host per attack. Contrast this with the situation today in which the source address in the single attack packet can be spoofed and then the destination has no way of telling where the packet actually came from.

Proactive strategies are facilitated. For example, suppose the a government computer system were under attack and that authorities suspect that the attack is originating from the United States, but that spoofed addresses are from central Europe. In response to a potentially suspicious query, the authorities could return a dynamically bound address in a geographically distinct location, say Australia and employ traffic monitoring devices to monitor relevant traffic bound for Australia. If the specific address in Australia was doled out very recently using SI mechanisms described herein (e.g., in response to a DNS query), there should be no reason for anyone else to use that address.

These and other traceback techniques are facilitated using spread-identity techniques.

End-Node Privacy

As explained above, end systems do not know the IP level identity of their end peer. Furthermore, by making the bindings for outgoing SI-NAT a pseudorandom function of day/time (or some other attribute), the same client will assume different apparent IP addresses. So IP based insertion and tracking of unwanted cookies (and other surreptitious state maintenance activity) may be substantially reduced. Likewise, automated communications to unwanted entities (e.g., spyware, etc.) can also be thwarted.

Security Improvements, Generally

Finally, as suggested throughout this description, overall security can be improved using spread-identity mechanisms.

Simpler control plane: because of many reasons including

Dynamic control of destination addresses allows the destination IP address itself to be leveraged as a "tag" to mark flows. For instance, some addresses from an address-pool could be set aside to be used only to tag "suspect flows".

Since all hosts (even at geographically different sites) within an organization are addressable by the same (or a very few) addresses, from the external world, it should help route agglomeration and reduce the routing table sizes in the core routers.

Collaboration between only the source (src) and destination (dst) SI gateways is sufficient to process unwanted traffic. Therefore, the need for non-local techniques that involve other routers will be substantially reduced.

SI mechanisms enable identity baiting whereby attackers can be made to follow a trail of identities to herd them into a corner of the name space where they can be trapped by special honeypots. The honeypots (or other similar targets) can employ special TCP stacks designed to function as countermeasures. For example, some specially designed stacks might not let the attacker disconnect, instead keeping the attacker connected but slowing the connection down to the bare minimal trickle needed to keep the connection alive. The attacker might merrily think that the server has been brought to its knees.

By ensuring that no access or egress past SI-gateway is possible without a SI-NAT token (i.e., SI-NAT mapping entry), some embodiments provide a mechanism to ensure that most unwanted traffic can be filtered and traced. For example, stealthy port-scans and other vulnerability probes that typically use IP address directly can be eliminated.

Compromise of end hosts is now a lot less effective/useful. Adversary must compromise an SI-gateway which is harder (gateways are likely to be monitored and are less accessible).

In summary, simple elegant information security architecture for security has been described which seamlessly and synergistically integrates principles of "Spreading-Identity" and "Indirection". In the context of the Internet, the identity of a host is its IP address. Accordingly, mechanisms detailed herein deliberately and dynamically spread the identity of a host so that the address/identity-resolution step can be leveraged as an implicit "token-granting" process. The resulting architecture enables IP addresses themselves to be used as "tags/markers" as well as dynamic access control/authentication tokens thereby significantly improving overall security (including extremely fast identification of malicious behavior, robust DDOS defense and offense capabilities, enhanced traceback and many other benefits).

Other Embodiments

While the invention(s) is (are) described with reference to various implementations and exploitations, it will be understood that these embodiments are illustrative and that the scope of the invention(s) is not limited to them. In general, configurations described herein may be implemented using networking facilities consistent with any communication media, standards or protocols hereafter defined. In addition, while our description of spread identity techniques has generally assumed double-end configurations, persons of ordinary skill in the art will recognize that the techniques described may be used in conjunction with only a single proxy or gateway. Spread identity systems in accordance with the present invention, whether implemented as gateways, routers, firewalls or proxies, or as embodiments that tend to blur distinctions between such implementations, are all envisioned.

Interestingly, the SI mechanisms described herein can be deployed partially and incrementally. Indeed, deployments at one site, or by one organization, do not necessarily require complementary deployments at each destination. Note that the existing DNS query syntax is untouched. Even when adopting SI techniques within an organization, that organization may choose to deploy SI mechanisms for outbound traffic only (e.g., deploying functionality describe herein with reference to SIRI-X and SIG-X) or for inbound traffic only (e.g., SIRO-Y and SIG-Y functionality) or both.

Many variations, modifications, additions, and improvements are possible. For example, while particular exploits and threat scenarios as well as particular security responses thereto have been described in detail herein, applications to other threats and other security responses will also be appreciated by persons of ordinary skill in the art. Furthermore, while techniques and mechanisms have been described using particular network configurations, services and protocols as a descriptive framework, persons of ordinary skill in the art will recognize that it is straightforward to modify such implementations for use in systems that support other network configurations, services and protocols.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A spread-identity gateway configured to be interposed between a destination node and a plurality of requesters,
   wherein the spread-identity gateway receives and returns a different DNS name resolution response to each of at least two inbound name resolution requests, wherein each DNS name resolution response includes an externally routable IP address for the destination node and is allocated from a pool of routable addresses maintained by the spread-identity gateway, and
   wherein the spread-identity gateway establishes, in correspondence with each returned DNS name resolution response, respective network address translations for purposes of at least some subsequently received packets corresponding to a respective transfer of data between the destination node and the plurality of requesters, and
   wherein the spread-identify gateway also dynamically binds a source address in place of a real IP address for hiding the real identity of the source node from the destination node, the dynamically bound source address being included in the respective network address translations.

2. The spread-identity gateway of claim 1,
   wherein the returned responses include protocol redirects returned to apparent sources of the inbound requests; and
   wherein the dynamic bindings of the respective apparent destination addresses are operative for at least one packet subsequently received from a same apparent source.

3. The spread-identity gateway of claim 1, wherein the gateway identifies the corresponding network address translation based on at least apparent source and destination addresses.

4. The spread-identity gateway of claim 1, wherein but for operation of a corresponding network address translation, the destination node is not reachable for inbound packets arriving from beyond the spread-identity gateway.

5. The spread-identity gateway of claim 1, wherein at least one of the dynamic bindings of apparent destination addresses is quenched to mitigate a security threat associated with the corresponding connection.

6. The spread-identify gateway of claim 1, wherein the apparent destination address returned in the DNS name resolution response or the apparent source address selected to be shown to the destination node is based on a time of day and a load condition.

7. The spread-identity of claim 1, further comprising a list of NAT entries identifying a one-to-many or a many-to-many or a many-to-one mapping of addresses by the spread-identity gateway visible to any source external to the spread-identify gateway.

8. A spread-identity gateway for a spread-identity system comprising:
   a spread-identity gateway interposed between at least one destination host and a plurality of requestors for receiving all inbound DNS name resolution requests from the plurality of requestors and for outputting one or more DNS name resolution responses each including a returned externally-routable IP address,
   wherein the returned IP address in each DNS name resolution response is dynamically selected from a pool of apparent IP addresses maintained by the spread-identity gateway,
   wherein the spread-identity gateway establishes, in correspondence with the DNS name-resolution responses, respective network address translations to enable each of the plurality of requestors to send at least one subsequent data packet using the selected apparent destination node IP address, and
   wherein the spread-identity gateway also binds an apparent source address and records it in the corresponding respective network address translation for hiding the real identity of a source node from the destination node.

9. The spread-identity gateway of claim 8 wherein, the spread identity gateway selects a second apparent IP address or a multitude of IP addresses from the pool of apparent IP addresses to support inbound data flows directed to the same destination node, and wherein at any given time the apparent IP address being used to support inbound data flows to the same destination node hides the real externally routable address of the destination node from sources beyond the spread-identity gateway.

10. The spread-identify gateway of claim 8 wherein the network address translations include:
    a source IP address used in the DNS name-resolution request;
    a destination address returned in response to the DNS name-resolution request;
    a blindfolded source address that is revealed to the destination node for hiding the real identity of the source node from the destination node; and
    a time-out period.

11. The spread-identify gateway of claim 8, wherein without the operation of the corresponding network address translations, the destination host is not reachable for inbound packets arriving from beyond the spread-identity gateway.

12. The spread-identity gateway of claim 8, wherein the spread-identity gateway dynamically allocates the externally routable IP address returned in response to the DNS name-resolution request using at least one of the source address visible in the DNS request received, the name used to identify the destination host in the DNS request, the time-of-day, the state of the destination host, the capacity of the destination host as well as the residual capacity of the destination host, indicating how many new incoming data requests the destination can handle, the state of the Local Area Network to which the destination host belongs, and the number and rate of DNS queries being received.

13. The spread-identity gateway of claim 8, wherein the spread-identity gateway is deployed at a source end to manage the outbound data flows in a manner that hides the real identity of the source end communicating via the spread-identify gateway with any destination end or for providing security from at least one of more threats including IP-address based tracking, stealthy port scans, malware, and exfiltration of information.

14. The spread-identity of claim 8, wherein the network address translations at least partially define dynamic tokens or tags that mark or identify the corresponding data flow for matching at least one subsequently received packet with at least one of the data-flows identified by their tokens or tags.

15. The spread-identity gateway of claim 8, wherein the mapping between real and apparent IP addresses appears to an observer who does not have the network address translations as one-to-many or a many-to-many or a many-to-one mapping of addresses by the spread-identity gateway.

* * * * *